Patented June 17, 1941

2,246,264

UNITED STATES PATENT OFFICE 2,246,264

CONDENSATION PRODUCTS FROM POLYCARBOXYLIC ACIDS

Walter Pinkernelle, Krefeld-Uerdingen, Germany, assignor to I. G. Farbenindustrie Aktiengesellschaft, Frankfort-on-the-Main, Germany No Drawing. Application October 19, 1937, Serial No. 169,795. In Germany October 31, 1936

9 Claims. (Cl. 260—475)

This invention relates to valuable condensation products from organic polycarboxylic acids and a process for the manufacture of the same.

According to the invention anhydrides of polycarboxylic acids two carboxylic acid groups of which are connected with adjacent carbon atoms are condensed with such tertiary amino compounds as contain in addition to the tertiary amino group also a reactive group which is capable of forming with the acid carboxyl group a functional derivative, such as a hydroxyl group or a primary or secondary amino group, the condensation being performed under such conditions that a polycarboxylic acid is formed in which one reactive group of the tertiary amino compound forms with one carboxylic acid group a functional derivative, for example a monoester or a monoamide, and in which at least one other carboxylic acid group remains unchanged.

Among the indicated acid anhydrides are suitable for the purpose of this invention, for example aliphatic polycarboxylic acid anhydrides, such as succinic acid anhydride, maleic acid anhydride, itaconic acid anhydride, citraconic acid anhydride, aconitic acid anhydride, aromatic polycarboxylic acid anhydrides, such as phthalic anhydride, substituted phthalic anhydrides, such as halogenated phthalic anhydrides, for example chloro-, bromo- or iodo-phthalic anhydride, alkylated phthalic anhydrides, such as methyl, ethyl, propyl and butyl phthalic anhydride, nitrophthalic anhydride, hemimellitic acid anhydride and trimellitic acid anhydride and likewise the polymeric polycarboxylic acid anhydrides obtainable by mixed polymerisation of maleic acid anhydride with unsaturated compounds, such as acrylic acid esters, vinyl halogenides, vinyl esters, vinyl ethers, styrol and others. Especially suitable for the purpose of this invention are succinic acid anhydrides substituted by a hydrocarbon radicle of at least 5 carbon atoms, such as succinic acid anhydrides substituted by a saturated hydrocarbon radicle of the kind specified, for example the anhydrides of amyl succinic acid, hexyl succinic acid, heptyl succinic acid, octyl succinic acid, dodecyl succinic acid and pentadecyl succinic acid, these anhydrides being obtainable, for example, in accordance with U. S. P. 2,121,183, by condensing hydrocarbons of the paraffine series, such as pentane, hexane, heptane, octane, dodecane, pentadecane with maleic acid anhydride, furthermore succinic acid anhydrides substituted by an unsaturated alkyl radicle of at least 5 carbon atoms, such as the anhydrides of amylene succinic acid, dodecenyl succinic acid and pentadecenyl succinic acid, the anhydrides being obtainable, for example, by condensing the corresponding olefines, such as amylene, nonylene, dodecylene and pentadecylene with maleic acid anhydride. Finally are especially to be mentioned succinic acid anhydrides substituted by an aralkyl radicle, such as γ-methyl-γ-phenyl-pyro-tartaric acid anhydride and γ-phenyl-γγ-dimethyl-pyro-tartaric acid anhydride, these anhydrides being obtainable, for example, by the process of U. S. P. 2,121,183 by condensing aliphatic hydrocarbons substituted by an aromatic radicle, such as toluene, ethyl benzene, diethyl benzene, propyl benzene and isopropylbenzene with maleic acid anhydride.

As tertiary amino compounds of the specified type are to be employed for the purpose of this invention among others tertiary amine alcohols, such as β-dimethylamino ethyl alcohol, β-diethylamino ethyl alcohol, β-diisopropylamino ethyl alcohol, β-dibutylamino ethyl alcohol, γ-diethylamino propyl alcohol, δ-diisopropylamino butyl alcohol, β-dibenzylamino ethyl alcohol, β-phenylethyl-amino ethyl alcohol, β-diphenylamino ethyl alcohol, N-(β-oxyethyl)-piperidine, N-(β-oxyethyl)-morpholine, quinine, cinchonine, tropine, morphine, amines carrying a tertiary amino group besides an amide-forming amino group, such as a primary or secondary amino group, for example N,N-dimethyl ethylene diamine, N,N-methylethyl ethylene diamine, N,N-diisopropyl putrescine, N,N-diethyl-N'-methyl ethylene diamine, N-β-aminoethyl piperidine, N,N,N'-triethyl cadaverine.

Among the mentioned starting materials, as well the acid anhydrides as also the amino compounds, those substances are particularly valuable for the process of this invention which contain open carbon chains with at least 5 carbon atoms.

For the manufacture of the condensation products the specified di- or polycarboxylic acid anhydrides are brought into reaction with the specified tertiary amino compounds advantageously in molar quantity proportions.

As a rule the components react immediately in bringing together with the evolution of heat. In some cases however it is necessary to heat the mixture of the polycarboxylic acid and the tertiary amino compound in order to obtain a reaction, it being in general sufficient for this purpose to employ a temperature from about 60 to about 100° C. It is to be understood that in order to obtain the result desired, the reaction is to be carried out in such a manner that no water is split off and that the reaction product becomes soluble in water, which may be easily stated by a simple test.

The specified condensation products and especially those of which one of the compounds employed for the condensation consists of a succinic acid anhydride of which one methylene group contains as substituent a radicle containing at least 5 carbon atoms are suitable as capillary active agents and soap substitutes in particular as wetting, washing and emulsifying agents. For this purpose both the internal ammonium salts and also the alkali salts, such as the sodium salts and the potassium salts being obtainable by neutralizing the free carboxylic acid group of a condensation product by means of sodium or potassium hydroxide can be employed. For example, a piece of cotton is wetted in about 9 seconds by an aqueous solution containing one part per thousand of a condensation product obtainable according to the following example 7. The capillary active agents can be used both alone and also in solution or in admixture with other substances, i. e. substances giving off oxygen or other capillary active neutral or alkaline reacting substances, such as sodium carbonate in the manner known per se.

The following examples illustrate the invention, without being restricted thereto; the parts are by weight:

Example 1

49 parts by weight of maleic acid anhydride are treated with 65 parts by weight of β-N-hydroxy ethyl piperidine; with strong exothermic heating (the temperature rises to about 110° C.) there is formed the internal salt of the maleic acid mono-β-N-piperidyl ethyl ester which posseses probably the following formula:

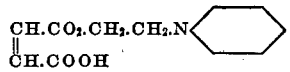

It constitutes a light brown, springy-hard resin which is easily soluble in water, alcohol, acetone and methylene chloride.

Example 2

49 parts by weight of maleic acid anhydride and 87 parts by weight of β.N-di-n-butylamino ethyl alcohol are mixed together; the temperature thereby rises to about 95° C. The reaction product constitutes a dark yellow tough resin which is easily soluble in water, dilute hydrochloric acid, dilute caustic soda lye, dilute sodium carbonate solution, acetone, benzene and methylene chloride. It has probably the following constitution:

$$CH.CO_2.CH_2.CH_2.N(C_4H_9)_2$$
$$\parallel$$
$$CH.COOH.$$

Example 3

74 parts by weight of phthalic anhydride are mixed with 66 parts by weight of hydroxy ethyl morpholine; the temperature thereby rises slowly to 42° C. The reaction mixture is heated with stirring for about 10 minutes to 130° C. After cooling the internal salt is obtained as a light brown springy-hard resin which is easily soluble in water, alcohol, benzene, acetone and methylene chloride and has probably the following constitution:

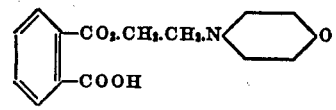

Example 4

74 parts by weight of phthalic anhydride are mixed with 75 parts by weight of triethanol amine and heated with stirring for about 10 minutes to 110° C. The phthalic acid mono-β-N-di-(hydroxy-ethyl)-amino ethyl ester constitutes a yellow tough mass which is easily soluble in water and alcohol.

Example 5

224 parts by weight of isononenyl succinic acid anhydride produced according to Example 1 of specification Ser. No. 75,889 and 131 parts by weight of hydroxy-ethyl morpholine are mixed together. The temperature rises first very slowly and is finally brought to 100° C. by heating. After cooling, the isononenyl succinic acid mono-β-N-morpholyl ethyl ester constitutes a yellow tough resin which is easily soluble in water, alcohol, benzene, petrol ether, acetone, chloroform and linseed oil. The aqueous solution foams very strongly and is clear in the cold. The salt has probably the following formula:

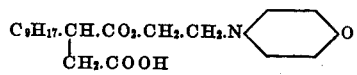

Example 6

168 parts by weight of isononenyl succinic acid anhydride (see Example 5) and 88 parts by weight of β-N-diethylamino ethyl alcohol are mixed together. With strong exothermic heating there is easily formed the internal salt of the isononenyl succinic acid mono-β-N-diethylaminoethyl ester. It is a light yellow viscous oil which is easily soluble in water, dilute hydrochloric acid, dilute sodium carbonate solution, dilute caustic soda lye, alcohol, ether, benzene, petrol ether, methylene chloride and acetone. It has probably the following constitution:

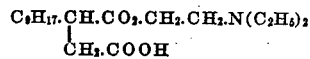

Example 7

350 parts by weight of a substituted succinic acid anhydride mixture, which is obtained when a mixture of isopentadecylenes is brought into reaction with maleic acid anhydride, are mixed with 149 parts by weight of triethanolamine; the temperature rises to 80° C. and is maintained for about half an hour by the supply of heat. The reaction product constitutes a yellow tough mass which is easily soluble in water, alcohol, acetone, benzene, linseed oil.

Example 8

204 parts by weight of α-phenyl-ethyl-succinic acid anhydride are treated with 149 parts by weight of triethanolamine; the temperature immediately rises to about 95° C. The reaction product is a dark yellow extremely tough resin which is easily soluble in water; it has probably the following constitution:

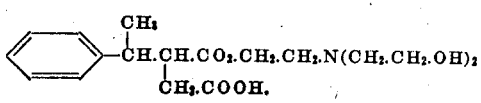

Example 9

260 parts by weight of a substituted succinic acid anhydride which is obtained by interaction of diisopropylbenzene with maleic anhydride according to U. S. P. 2,121,183 are mixed with 117 parts by weight of β-N-diethyl-amino ethyl alcohol. Reaction takes place with strong exothermic heating, whereby the reaction product is obtained as a light brown tough resin which is easily soluble in water and organic solvents.

Example 10

302 parts by weight of a substituted succinic acid anhydride which is obtained according to U. S. P. 2,121,183 by interaction of triisopropyl benzene with maleic anhydride, are mixed with 149 parts by weight of triethanol amine; with strong exothermic heating the internal salt is formed which is easily soluble in water and organic solvents.

I claim:

1. A monoester of a polycarboxylic acid having at least two carboxylic acid groups connected with two adjacent carbon atoms and a tertiary amine alcohol.
2. A monoester of an aromatic dicarboxylic acid, the carboxylic acid groups of which are connected with two adjacent carbon atoms and a tertiary amine alcohol.
3. A monoester of phthalic acid and a tertiary amine alcohol.
4. The monoester of phthalic acid and triethanol amine forming a tough mass easily soluble in water and alcohol.
5. A monoester of an aliphatic dicarboxylic acid, the carboxylic acid groups of which are connected with two adjacent carbon atoms and a tertiary amine alcohol.
6. A monoester of a succinic acid substituted by a hydrocarbon radicle of at least 5 carbon atoms and a tertiary amine alcohol.
7. A monoester of a succinic acid substituted by an unsaturated alkyl radicle of at least 5 carbon atoms and a tertiary amine alcohol.
8. The monoester of isopentadecenyl succinic acid and triethanol amine, this ester being easily soluble in water, alcohol, acetone, benzene, carbon tetrachloride, linseed oil.
9. The monoester of isononenyl succinic acid and β-N-diethyl amino ethyl alcohol, this ester forming a viscous oil, easily soluble in water, diluted hydrochloric acid, diluted sodium carbonate solution, alcohol, ether and benzene.

WALTER PINKERNELLE.